United States Patent [19]

Davidsson

[11] Patent Number: 4,830,174
[45] Date of Patent: May 16, 1989

[54] DEVICE FOR SECURING OBJECTS

[76] Inventor: Mats I. Davidsson, Djupadal, S-502 78 Ganghester, Sweden

[21] Appl. No.: 27,004

[22] Filed: Mar. 17, 1987

Related U.S. Application Data

[63] Continuation-in-part of Ser. No. 852,445, Mar. 20, 1986.

[30] Foreign Application Priority Data

Jul. 23, 1984 [SE] Sweden ................................. 8403820

[51] Int. Cl.⁴ ............................................ B65G 17/32
[52] U.S. Cl. .................................. 198/465.4; 294/104;
   198/470.1; 198/803.3; 198/678; 211/45; 24/241 PL
[58] Field of Search ................... 198/620, 465.4, 485.1,
   198/486.1, 477.1, 470.1, 803.3, 803.7, 803.8,
   678; 294/104, 82.31; 104/250; 211/45; 24/241
   PS, 241 SL, 241 PL, 67.5, 67.7, 490, 502, 511

[56] References Cited

U.S. PATENT DOCUMENTS

| | | | |
|---|---|---|---|
| 1,423,952 | 2/1922 | McCracken | 198/803.3 X |
| 1,864,114 | 6/1932 | Angerpointer | 198/680 |
| 2,852,257 | 9/1958 | Sperry | 198/680 |
| 3,023,878 | 3/1962 | Fortsthoff et al. | 198/803.7 |
| 3,091,326 | 5/1963 | Connick et al. | 198/803.3 |
| 3,262,579 | 7/1966 | Reich | 211/45 |
| 3,884,370 | 5/1975 | Bradshaw et al. | 198/803.7 X |
| 3,904,027 | 9/1975 | Gilles et al. | 294/104 X |
| 3,960,264 | 6/1976 | Carbiue et al. | 198/465.4 X |
| 4,199,173 | 4/1980 | Greenless | 281/45 |

FOREIGN PATENT DOCUMENTS 0160419 3/1933 Switzerland .
0170749 7/1934 Switzerland .

Primary Examiner—Robert J. Spar
Assistant Examiner—D. Glenn Dayoan

[57] ABSTRACT

The present invention relates to a device for securing objects. The device comprises a frame and a locking arm, having a pivot end, by which the locking arm is pivotally mounted in the frame and an opposite free locking end. The frame includes a member for carrying the locking arm and surfaces, against which the free end of the locking arm is positioned in a securing position, securing the object lying in between the free end and the surfaces. The free end is removable into a releasing position by pivoting the locking arm. The surfaces are provided to restrict the pivotal motion of the locking arm in one direction of pivoting. The surfaces form a limit stop, forming part of two legs with an interspace betweem them, into which the locking end of the locking arm projects in the securing position. The legs have at least one stop surface limiting the pivoting movement of the locking arm.

3 Claims, 6 Drawing Sheets

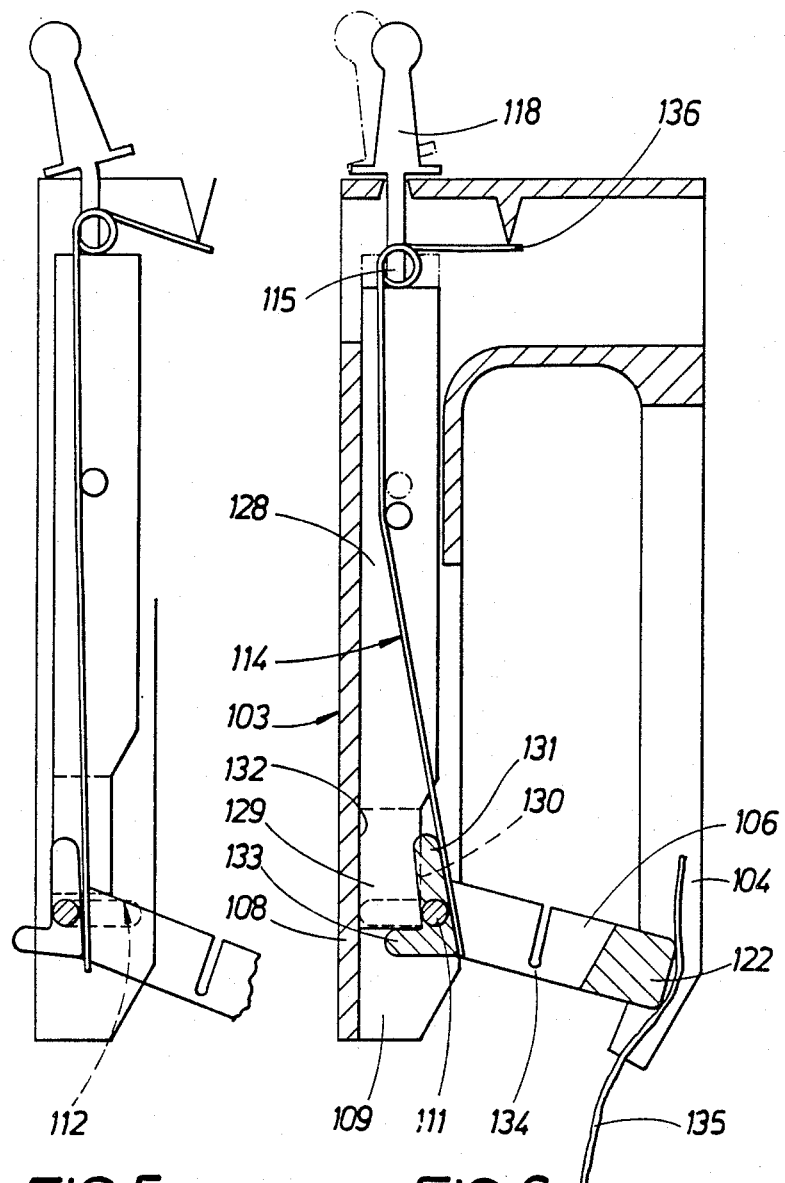

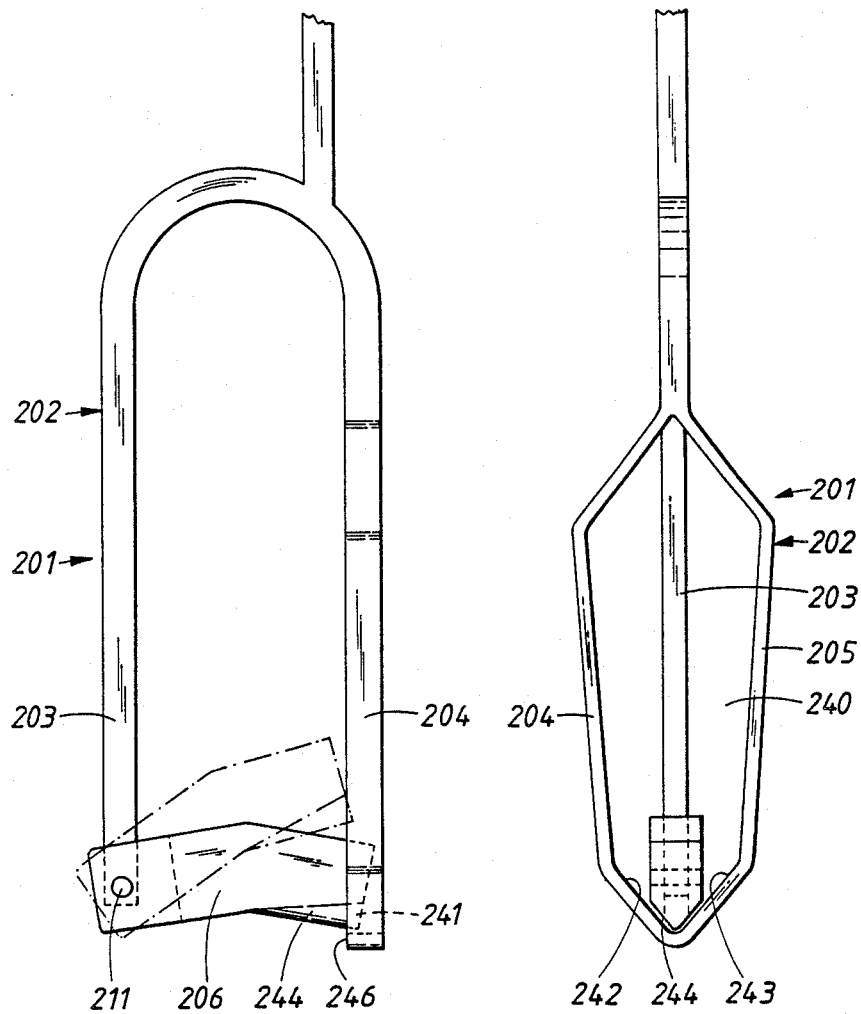

DEVICE FOR SECURING OBJECTS

This is a continuation-in-part of Ser. No. 852,445, filed Mar. 20, 1986.

TECHNICAL FIELD

The present invention relates to a device for securing objects, said device comprising a frame and a locking arm, having a pivot end, by means of which the locking arm is pivotally mounted in said frame and an opposite free locking end, said frame including means for carrying said locking arm and surface means, against which the free end of the locking arm is positioned in a securing position, securing the object lying in between said free end and said surface means and from which the free end is removable into a releasing position by means of pivoting the locking arm, said surface means being provided to restrict the pivotal motion of the locking arm in one direction of pivoting.

BACKGROUND

For the purpose of securing objects, for example pieces of material, in such a way that the object can be released easily, a number of different solutions is available depending on the desired function and the type of the object. Previously disclosed for the purpose of securing pieces of material, for example, is a device in the form of a spring-loaded arm which secures an object by friction against a flat surface positioned in front of it. By moving the arm out of the way in an upward sense the piece of material can be removed from its secured position. To overcome the friction by lifting the arm can cause damage to delicate pieces of material in certain circumstances, because of the pressing action between the arm and the flat surface.

TECHNICAL PROBLEM

The object of the present invention is to eliminate the aforementioned disadvantages by means of a securing device which does not require any high pressure for the arm against the opposite surface.

THE SOLUTION

Said object is achieved by means of the device according to the present invention, wherein said surface means form a limit stop, forming part of two legs with an interspace between themselves, into which the locking end of the locking arm projects in said securing position, said legs having at least one stop surface limiting said pivoting movement of the locking arm.

BRIEF DESCRIPTION OF DRAWINGS

The invention is described below in more detail in relation to a number of typical embodiments with reference to the accompanying drawings, of which FIG. 5 shows a longitudinal section through the device in a second embodiment in a first position, whilst FIG. 6 shows the device in a second position, FIGS. 10 and 11 show the device in a third embodiment in two different views and FIG. 12 shows the third embodiment in a perspective view with a piece of material held by the present invention.

BEST MODE OF CARRYING OUT THE INVENTION

The device in accordance with the examples shown has been produced especially in order to permit the efficient handling of pieces of textile material in the clothing industry. The suspension means in the example shown is intended to constitute or form part of a transport unit in an overhead conveyor system for the transport of pieces of textile material between different work stations, in which case it is important to be able to release the pieces of cloth effectively from the suspension means without the risk of damage to the textile material.

Figure 1:
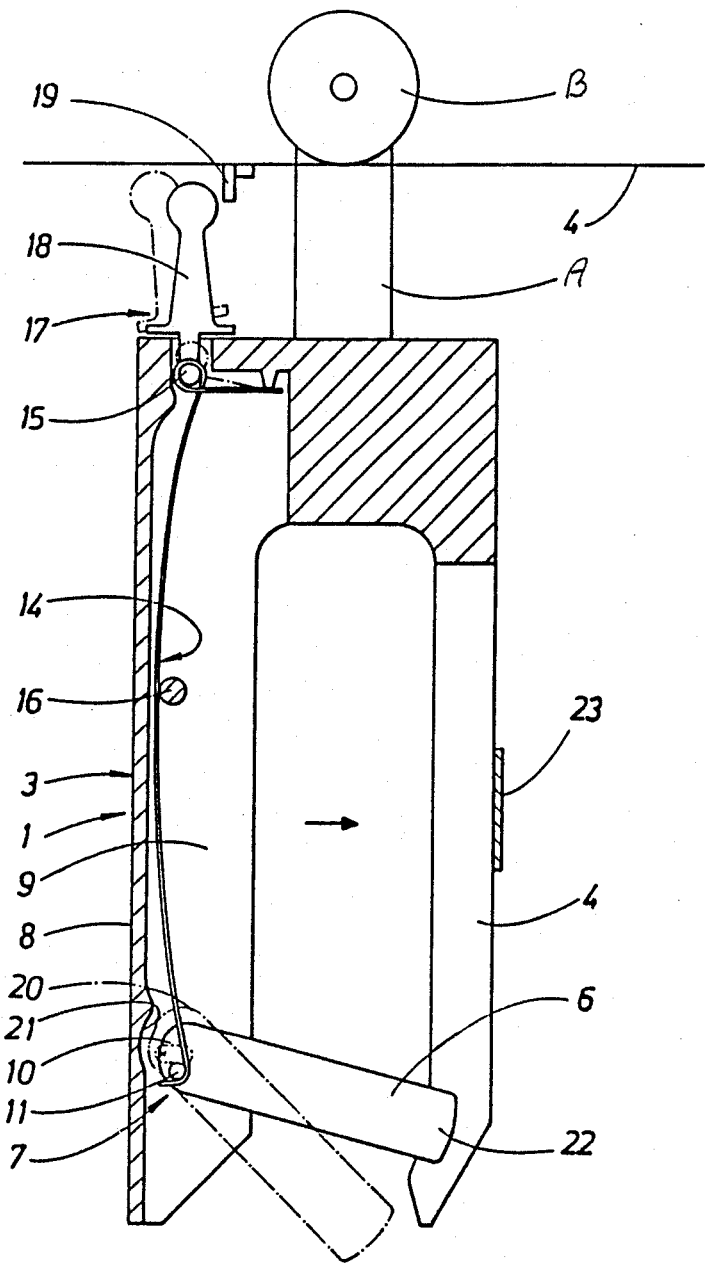
FIG. 1 shows a longitudinal section through the means in accordance with the invention in a first embodiment.
Figure 2:
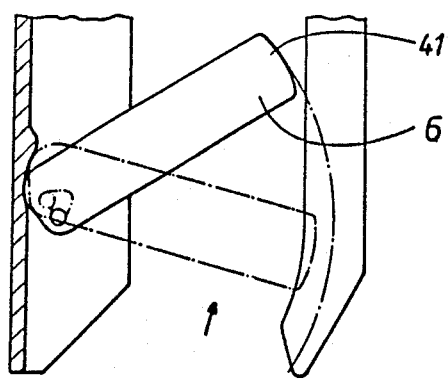
FIG. 2 shows part of the device in accordance with FIG. 1 in a different position.
Figure 3:
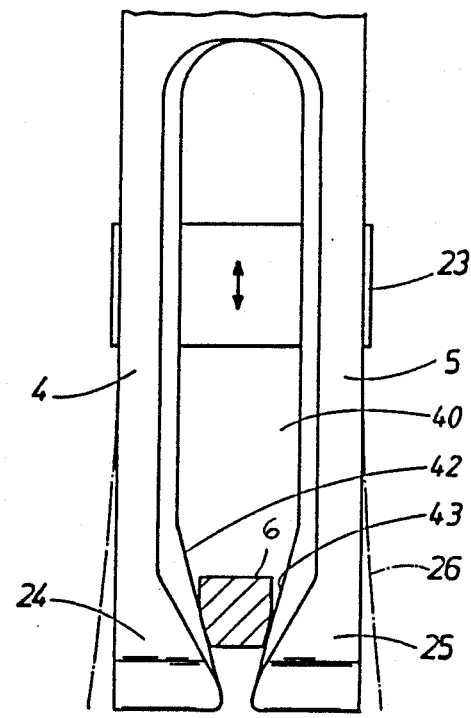
FIG. 3 shows a partly sectioned view from the front of the device in accordance with FIG. 1.
Figure 4:
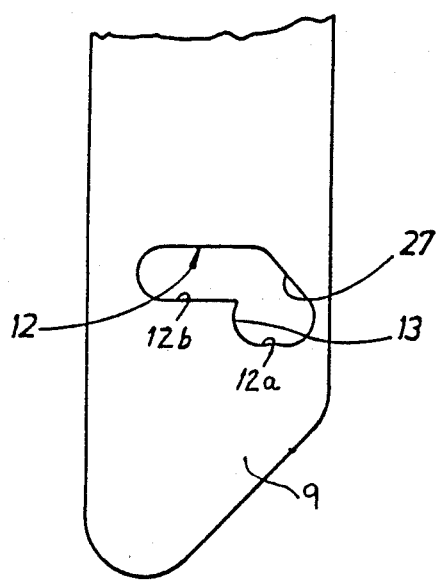
FIG. 4 shows on a larger scale a part of the device in accordance with the invention.

As may be seen from FIG. 1, a section is shown through a securing device 1 in accordance with the invention in the form of a first embodiment suspended by means of a bracket A from a conveyor roller B, by means of which the suspension means moves along a conveyor 4 represented schematically. The movement may be achieved, for example, by giving the conveyor a certain inclination so that the suspension means will move of its own accord. The suspension means consists of a frame 2 with a rear frame leg 3 and two front frame legs 4, 5, one of which is cut away in FIG. 1. The construction of the front two frame legs is apparent from FIG. 3, however. A central part of the suspension means is formed by a locking arm 6 which is pivotally mounted in a supporting means 7 in the rear frame leg 3, whilst the securing and locking of the object which is to be secured takes place against the front two frame legs 4, 5 which in this case form a holder against the locking arm. The rear frame leg in the example shown exhibits a U-shaped section with a back piece 8 and two side pieces 9, of which one is cut away in the figures. Between the two side pieces 9 there is formed a space into which the locking arm extends by its rear end called pivot end 10, in which case the arm exhibits a transverse shaft 11 or two side-facing pins which project into a slot 12 specially provided for that purpose in each of the side pieces 9. The shape of the slot is best appreciated from FIG. 4. The special shape of the slot provides two stable supporting or pivoting points for the locking arm 6, namely a front supporting or pivoting point 12a in which the arm is shown to be located in accordance with th solid line in FIGS. 1 and 2, and a rear supporting or pivoting point 12b in which the arm is shown to be located in accordance with the dot-and-dash line in FIGS. 1 and 2. The slot is shown to be of rather different shape in FIG. 2, although it provides the same function as the slot in accordance with FIGS. 1 and 4.

The device also exhibits in the typical embodiment shown a spring mechanism 14 in the form of a wire spring, which at the bottom is hooked around the shaft 11 and is held between an upper pin 15 and a fixed, interjacent pin 16 which projects from one of the side pieces 9, whereby the spring mechanism 14 endeavours to retain the locking arm 6 with the shaft 11 in position at both its pivoting or support points. The spring mechanism 14 also forms part of a release mechanism 17 which also incorporates a control lever 18, upon actuation of which the spring mechanism is caused to rise by the fact that the pin 15 is attached to the lower end of the lever 18. By moving the lever to the position indicated by a dot-and-dash line in FIG. 1, the mechanism is caused to rise with the result that the locking arm 6 with its shaft 11 is lifted from its front pivoting point 12a in an upward sense and is caused to move backward the rear pivoting point 12b under the effect of the rearward-acting spring bias from the spring mechanism. The control lever 18 can either be operated manually or automatically, for example by means of a downward-projecting and preferably flexible activating element 19 situated at a work station, for example, with the result that the piece of material can be released automatically to fall at the desired point.

The locking arm 6 also exhibits at its rear end 10 a cam 20 so arranged as to interact with a control surface 21 on the back piece 8 causing the locking arm 6 to move forwards from the rear pivoting point 12b to the front pivoting point 12a when the locking arm 6 is moved in a direction from the bottom upwards with its front end 22, for instance between the positions illustrated in FIG. 1.

As will be appreciated from the figures, the front end called locking end 40 of the locking arm 6 projects for a certain distance between the front two frame legs 4, 5 which are made from an elastic material. The flexibility of the frame legs 4, 5 can thus be regulated by means of a bridging element 23 which is capable of being displaced up or down the two frame legs. In its upper position the frame legs are permitted to flex to a great extent, enabling the front end of the locking arm to be pushed between the thickened free ends 24, 25 of the two frame legs and beyond them, this being represented schematically by means of dot-and-dash lines 26 in FIG. 3. In a lower position with the element 23 pushed down towards the free ends 24, 25 the two frame legs 4, 5 are rigid to all intents and purposes and are even capable of entirely blocking the passage of the locking arm 6 between the two legs. The two frame legs 4, 5 form between themselves an interspace 40 into which the free locking end 41 of the locking arm 6 projects in a securing position of the arm, in which an object is secured. The thickened free ends 24, 25 of the two frame legs are provided with oblique surfaces 42, 43 converging downwards and forming stop surfaces for the locking end 41 of the locking arm. The length of the locking arm 6 is such, however, that said blocking will not occur with the locking arm in its rear position, that is to say with the shaft 11 positioned at the rear pivoting point 12b.

The use of the device in accordance with the invention in its first embodiment is explained with reference to FIGS. 1-4. It is assumed for this purpose that the movable element 23 adopts a position, for instance the position shown in FIGS. 1 and 3, which affords flexibility to the front legs 4, 5. The initial position can be either with the locking arm 6 at its front pivoting point or with the locking arm at its rear pivoting point. We have assumed here that the locking arm is at its position indicated by dot-and-dash lines in accordance with FIG. 1, and with the shaft 11 at its rear pivoting point. The securing device is then in its released position. A piece of flexible sheet material, such as textile material is inserted by holding the piece of material by its upper edge with one hand and by moving the piece of material upwards in the gap between the rear and front frame legs 3, 4, 5, and then with the same hand moving the locking arm 6 upwards by causing it to pivot in an upward sense. The locking arm will then be in a rear position in which the locking arm is essentially free to move past the two front frame legs 4, 5 without being obstructed by them, in which case the piece of material will be situated between the free end 22 of the arm 6 and the legs 45. As the arm is swung upwards, the cam 20 on the arm will engage with the control surface 21, causing the shaft 11 to move forwards in the slot 12, and as a certain angle of pivoting is passed by the arm 6, for instance the angle shown in FIG. 2, the shaft 11 will be moved downwards and into its front supporting point resting against the supporting surface 13. Once the front supporting point has been adopted, the locking arm will have reached the pivoting position shown by solid lines in FIG. 2. If the locking arm 6 is now permitted to swing back into essentially the position indicated by solid lines in FIG. 1, the arm will be blocked against the front frame legs 4, 5 with the piece of material in between. The fact that the arm projects slightly between the frame legs will cause the piece of material to be folded slightly into the shape of a "U", causing it to be held securely. The device in this case will be in the securing position, enabling the piece of material to be carried along the conveyor for the purpose of moving it to another work station. When it is wished to remove the piece of material, this can be done in two different ways. The simplest way of achieving this is to pull the piece of material in a downward sense, when the locking arm will be allowed to move past the two frame arms 4, 5 which will flex out of the way to a certain extent so that the locking arm can swing down into the position shown in FIG. 1 in dot-and-dash lines. The locking arm 6 is thus so arranged as to be released by being swung down at the same time as a force acting upon the arm is overcome, said force being considerably greater than the force required to swing the arm upwards. When a new piece of material is to be inserted, the locking arm can be returned by the application of light pressure to the outer end 22 of the locking arm, causing the locking arm to move to its rear position at the rear pivoting point. Alternatively, it is possible for the piece of material, as described above, to be released automatically or manually by activating the lever 18, causing the locking arm 6 to move to its rear pivoting point so that the piece of material is released.

Figure 7:
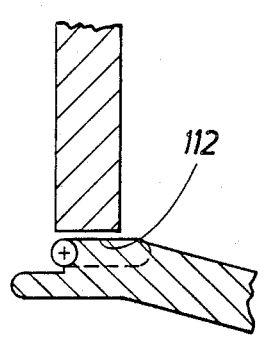
FIGS. 7, 8 and 9 show parts represented entirely schematically in three different positions.
Figure 8:
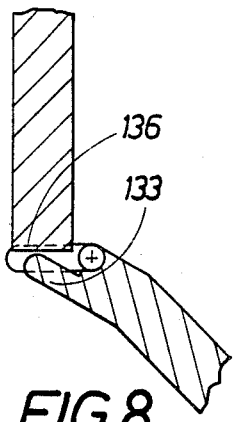
Figure 9:
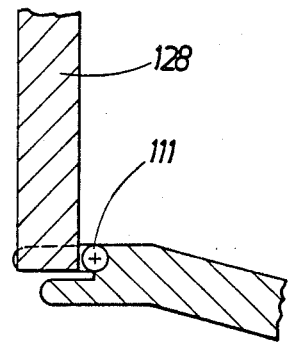

The embodiment in accordance with FIGS. 5 and 6 in principle exhibits the same function with regard to the action of the locking arm. In this second embodiment, the components which are the same as those in the first embodiment have been allocated corresponding reference designations, but with the addition of 100. In this case the mechanism for holding the locking arm 106 about its front pivoting point is executed differently. In this embodiment the slot 112 is executed as a straight slot, to which has been added a long activating rod 128 which extends into the rear frame leg between the upper attachment 115 of the spring mechanism 114 and the rear end of the locking arm 106. The activating rod 128 is capable of being moved between an upper position as shown in FIG. 5 and a lower position as shown in FIG. 6 in a fashion described in greater detail below. The prepared section shown in FIGS. 5 and 6 is considered to extend centrally, from which it will be apparent that the activating rod 128 is divided at the bottom into two shanks 129 extending along the inside of the two side pieces 109, said shanks being intended to interact with the pins 111 of the locking arm 106 in such a way that, with the activating rod 128 in its lower position in accordance with FIG. 6, the locking arm 106 is held in its front pivoting position by interaction between the front edges 130 and said shanks and the pins. The locking arm 106 is also executed at its rear end with a normal upward-facing finger 131 which can be introduced into the space between the two shanks 129, in this way not interfering with them and yet assuring the position of the locking arm for the purpose of its movement from its rear pivoting point to its front pivoting point through interaction with the wall 132 of the back piece 108 as it is swung from the downward, released position and in an upward sense. A normal, backward-facing finger 133 serves the function of moving the activating rod 128 from its lower position to its upper position whilst the locking arm 106 is being swung downwards. This may be appreciated from the schematic views in FIGS. 7, 8 and 9, which show a section made alongside the central section shown in FIGS. 5 and 6, and more precisely through one of the shanks 129, in connection with which the upward-facing finger 131 does not lie in the section and is not illustrated in the interests of clarity.

With further reference to FIGS. 5 and 6 it is evident that the locking arm 106 is also in two parts and is articulated at an articulation point 134, whereby in certain circumstances it is possible for the arm to be swung upwards without being moved from the front pivoting point to the rear pivoting point. In this case the locking arm 106 is best made from a high-grade elastic material such that the inherent elasticity of the material can be utilized to provide said articulated function.

The use of the device in accordance with the second embodiment is explained with reference to FIGS. 5–9. The initial position is such that a piece of material 135, shown in section in FIG. 6, is held securely between the free outer end 122 of the locking arm 106 and the two front legs 104.

The activating rod is thus in its lower position, when its shanks 129 prevents the pins 111 from being displaced from their front pivoting point under the effect of the spring mechanism 114, thereby causing the piece of material to be held securely in the manner described above. The interaction between the activating rod 128 and the pins 111 may also be appreciated from FIG. 9. By pulling the piece of material 135 in a downward sense, the locking arm 126 will be caused to accompany it because of the friction between the free end 122 of the locking arm and the piece of material, in which case the backward-facing finger 133 will be caused by being forced against the underside 136 of the activating rod 128 to lift the latter in such a way that the lower edges of the shanks adopt a position above the pins 111, in which case the locking arm will be caused to move under the effect of the spring mechanism 114 to its rear pivoting position in accordance with FIGS. 5 and 7 by the movement of the pins 111 along the straight slot 112.

When another piece of material is to be inserted, the locking arm is moved in an upward sense with the result that, as shown by FIG. 5, the upward-facing finger 131 will, through its contact with the wall 132, cause the pins of the locking arm to move forward until the activating rod 128 drops down through the effect of the spring mechanism 114, which is pretensioned against a support point 136 in such a way that a downward-acting force is applied to the activating rod.

By analogy with the alternative possibility in the first embodiment, manual or automatic release can be provided by means of the control lever 118, the actuation of which will cause the activating rod 128 to be raised and the corresponding events to occur, as described above.

Figure 12:
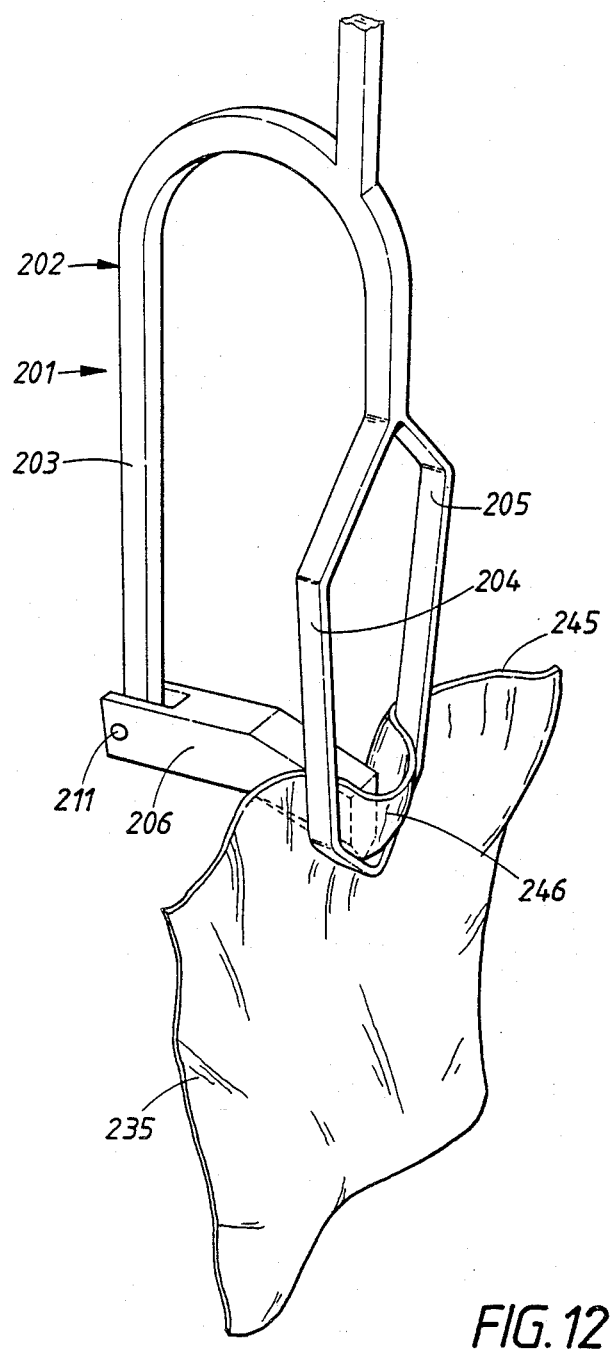

In the third embodiment, shown in FIGS. 10, 11 and 12 the components which are the same as those in the first embodiment have been allocated corresponding referenced designations, but with the addition of 200. In this embodiment the two front legs 204, 205 have their oblique surfaces 242, 243 which act as stop surfaces, joined together so that the interspace 240 are fully enclosed by the two legs when regarded two-dimensionally, see FIG. 11. In the shown embodiment the locking arm 206 is pivotally journalled by means of its shaft 211 in the rear frame leg 203 so that merely a pivoting movement relative to the rear frame leg occurs and no other displacement movement. The stop surfaces 242, 243 form an oblique angle relative to each other and to the plane, normally vertical plane, along which the locking arm 206 pivots. Further, the locking arm in this embodiment is formed as an integral piece without any articulation point dividing the arm. This results in that the stop surfaces 242, 243 form a full stop for the locking arm 206 the free locking end 241 of which is given a V-shape with converging contact surfaces 244 which in the shown example are given the same angle as the corresponding stop surfaces 242, 243 so that substantially a surface contact will arise in the locking position, shown in FIG. 10 and 11 with full lines. The releasing position is shown with dashed and dotted lines in FIG. 10, in which the piece of flexible sheet material 235, shown in FIG. 12, can be put in place for securing or be released from securing position. Preferably the locking arm 206 is spring biased relative to the rear frame leg 203 by means of a spring not shown, for example mounted around the shaft 211 and in its ends connected with the rear frame leg 203 and the locking arm 206 respectively. The action of the spring is such that the locking arm 206 always tends to take its securing position, but can be removed from that position by means of some finger of a hand pressing on the locking arm from below.

Also in the third embodiment the securing device preferably is part of a conveyor system as is shown in the embodiment of FIG. 1 and hangs down from a wheel able to roll along a path such as a conveyor rail. Consequently the frame substantially hangs vertically with its rear frame leg 203 and the locking arm 206 in its securing position is biased in direction downwards against the locking surfaces 242, 243.

In the shown third embodiment the locking arm 206 is somewhat angled to form an underside which is easy to lift by pushing the locking arm upwards by means of some finger of a hand, whereby the locking arm pivots counter clock-wise to the position shown in FIG. 10 with dotted and dashed lines or any other position pivoted upwards so that a distance arises between the contact surfaces 244 of the locking arm and the stop surfaces 242, 243 of the two front legs 204, 205. In practice the locking arm 206 is lifted automatically by placing the piece of flexible sheet material 235 in its position for securing by the securing device. The operator has normally the piece of flexible sheet material 235 pinched between fingers of her hand over a top edge portion 245 of the piece of material. Then she brings her hand to the underside of the locking arm 206 which thereby pivot upwards so that an upper part of the piece of material 235 is brought into the interspace 240 between the two front legs 204, 205 and also between the free locking end 241 of the locking arm and the stop surfaces 243, 244. When removing her hand the locking arm 206 rapidly pivots downwards in the clock-wise direction towards the stop surfaces 242, 243 with the piece of material 235 pinched therebetween and held by means of the securing means with the rest of the piece of flexible sheet material hanging downwards. The piece of flexible sheet material 235 is securely held without the need for any high surface pressure because of the fact that the stop surfaces are not a vertical surface but faced in a large extent upwards deviating from an imagined vertical plane along which a stiff sheet material would have extended. However, by means of the flexible character of the sheet material and the fact that the locking arm 206 also extends somewhat between the front legs 204, 205 and that the stop surfaces 243, 244 though facing somewhat upwards, are inclined so that the piece of material 235 forms a portion 246 which is deformed and extends into the interspace 240 and extends partially around the front legs 204, 005 and especially around edge portions 246 directed towards the locking arm 206. It is important that the locking end 241 extends in a proper degree between the two front legs 204, 205 and not too long so that proper deformation arises. More precisely the free locking end must extend past the edge portion of the stop surfaces 242, 243. Preferably the contact surfaces 244 of the locking arm and normally the whole free end of the arm have high friction surfaces resulting in that a tendency of the piece of sheet material 235 to leave its secured position will result in an increased pinching action by means of the locking arm 206. This is the case for example when a heavy piece of material 235 is present or when somebody unintentionally pulls the sheet of material downwards.

The removal of the piece of flexible sheet material 235 takes place in a simple way by pressing the locking arm 236 upwards with a finger of a hand so that the locking arm leaves the contact with the piece of material. Simultaneously the piece of material is grabbed by means of the hand and brought to the desired place. In many cases the piece of material can be allowed to fall downwards by its own weight.

The invention is not restricted to the typical embodiments described above and illustrated in the drawings, but may be modified within the scope of the following patent claim. For example, the means in accordance with FIGS. 5 and 6 need not be provided with the articulated function which divides the locking arm into two parts articulated relative to each other. Furthermore, neither the first nor the second embodiment need necessarily exhibit the separate release mechanism with the lever 18.

The different embodiments can arise in different combinations. For example the third embodiment according to 10-12 can have the displaceable shaft of the type shown in the first and second embodiments with or without the release mechanism 17. Further the front legs 204, 205 of the closed type according to the third embodiment can be combined with a locking arm having an articulation point of the type shown in the second embodiment, see FIG. 6. The two legs 204, 205 need not have their stop surfaces 242, 243 joined together, but can still be relatively rigid and need not having a bridging element 233 displaceable for regulating the flexibility of the legs 204, 205. Further the flexible sheet material need not be a textile material, but can be any type of flexible sheet material, such as plastic or paper material.

What I claim is:

1. Device for securing flexible sheet objects in a hanging conveyor which is provided to transport secured objects between predetermined stations, said device comprising a frame and a locking arm, said arm having a pivot end pivotally mounted in said frame and an opposite free locking end, said frame including first frame means for pivotally supporting said locking arm and second frame means, stop surface means supported by said second frame means, the free end of said locking arm being movable to a securing position against said stop surface means, in which position it bridges an interspace between said first and second frame means and can secure an object in between said free end of said arm and said stop surface means with said object hanging downwards therefrom, said free end of said arm being removable from said securing position and movable to a releasing position upon pivoting of said locking arm, said stop surface means being positioned to restrict the pivotal motion of the locking arm in a downwards direction of pivoting of said locking arm, and wherein said stop surface means form a limit stop comprised of part of two legs between which the free locking end of the locking arm projects in said securing position thereof, said legs supporting said stop surface means, and said stop surface means being divided into two upwardly facing stop surface portions which extend obliquely relative to each other and relative to a plane along which said locking arm is pivotable, said stop surface portions having edge portions positioned adjacent said interspace, and said locking arm, in its securing position, extending with its locking end above and beyond said edge portions, whereby a secured flexible sheet object is deformed by said locking end of said arm and projects with a portion thereof above said stop surface portions and hangs down from said edge portions.

2. Device according to claim 1, wherein said two legs are joined at bottom ends thereof by means of said stop surface portions which converge to a joining point.

3. Device according to claim 1, wherein the stop surface portions are resilient.

* * * * *